United States Patent [19]
Tortellier

[11] Patent Number: 5,113,896
[45] Date of Patent: May 19, 1992

[54] SAFETY VALVE FOR FLUID CIRCUIT
[75] Inventor: Christian Tortellier, Noyal sur Vilaine, France
[73] Assignee: Hydris, Chateaubourg, France
[21] Appl. No.: 767,517
[22] Filed: Sep. 30, 1991
[30] Foreign Application Priority Data
   Oct. 3, 1990 [FR] France ............... 90 12203
[51] Int. Cl.⁵ .................................. F16K 13/11
[52] U.S. Cl. ...................... 137/269; 251/129.03; 251/129.15
[58] Field of Search ............ 251/129.15, 129.03; 137/269, 270, 271
[56] References Cited
   U.S. PATENT DOCUMENTS
   4,790,345  12/1988  Kilchinsky ............. 251/129.15 X
   5,050,840   9/1991  Kondo ................... 251/129.15

FOREIGN PATENT DOCUMENTS
1257143   2/1960  France .
 853469  12/1956  United Kingdom .

Primary Examiner—Alan Cohan
Attorney, Agent, or Firm—Michael, Best & Friedrich

[57] ABSTRACT

The invention relates to a safety valve provided with an electromagnet for controlling opening thereof. According to the invention, a nut for assembling the solenoid of the electromagnet on the body of the valve comprises an inner stud which, when the solenoid is withdrawn, makes it possible to push the obturation member of the valve directly into its position of opening. One application of the invention is the production of a device for unblocking the valve in the event of failure of the electromagnet.

4 Claims, 2 Drawing Sheets

SAFETY VALVE FOR FLUID CIRCUIT

FIELD OF THE INVENTION

The present invention relates to a safety valve for fluid circuit.

BACKGROUND OF THE INVENTION

Numerous elevating devices comprising fluid jacks for controlling elevation are provided with safety valves whose principal function is double: not controlled, these safety valves prevent any accidental return of fluid towards the reservoir; controlled, they allow passage of fluid in the two possible directions of flow.

Certain of these safety valves have an electric control of the position allowing passage of the fluid by opening of the valve. Failures may occur on this electric control, and/or on the mechanical parts coupled thereto, and it has already been provided to overcome such failures, at least temporarily, by means of a voluntary valve-opening control actuated if desired by a user.

According to a known embodiment, a nut maintains the solenoid coil of the electromagnet controlling passage of fluid, in position assembled on the body of the valve, and comprises a bottom, traversed by a screw disposed opposite the core of said electromagnet. In the event of a possible failure, during which the electromagnet no longer controls opening of the valve, it suffices to rotate said screw until it pushes the valve in its position of opening.

However, it has been observed that this emergency valve-opening control itself broke down, this being principally due to the fact that, between the thread of the screw and the corresponding tapping of the bottom of the nut, a permanent clearance existed and allowed the introduction of humidity inside the mechanism, which caused this mechanism to rust, deteriorating both the emergency control and the electromagnetic valve-opening control.

It is an object of the invention to overcome this state of affairs by insulating the internal mechanism from the outside humidity, permanently except possibly temporarily when the voluntary emergency valve-opening control is actuated.

SUMMARY OF THE INVENTION

The invention therefore relates to a safety valve for fluid circuit comprising: a valve body comprising a cylindrical part which itself comprises an axial bore and an end threading; an obturation member, mobile with respect to said valve body, placed on a conduit which it separates into two parts, and capable of selectively occupying a first position, in which it obturates said conduit, and a second position in which the two parts of said conduit are in mutual communication; and elastic member for returning the obturation member into its first position; and electro-magnetic for electrically controlling opening of the valve, which comprises a solenoid coil presenting an axial cavity allowing passage of the cylindrical part of the valve body, as well as a core couled to the obturation member and contained inside said bore; a blind nut which comprises a tapping capable of cooperating with said end threading of said cylindrical part of the valve body in order to maintain said solenoid coil in its configuration of assembly with the valve body, and which comprises a face for clamping and a bottom opposite said clamping face.

According to the invention: a) a stud, fast with the nut, projects with respect to the inner face of the bottom of the nut and opposite the bore of said cylindrical part of the valve body; b) in the configuration of assembly of the solenoid coil with the valve body, the clamping face of the nut is in abutment on the solenoid coil, the axial length of said solenoid coil being such that said stud is then out of abutment on the end of the core of the electromagnet, the obturation member being, in addition, disposed in its first position; and c) in a configuration in which the solenoid coil is not disposed around said cylindrical part of the valve body, the fact of screwing the nut on the end threading of said cylindrical part is capable of placing said nut in a position with respect to the valve body in which the stud is in abutment on the end of the core of the electromagnet and has repelled said core and the obturation member coupled thereto, placing this obturation member in its second position.

The following advantageous arrangements are, in addition, preferably adopted:

the placing in abutment of the transverse end edge of the cylindrical part of the valve body on that part of the inner face of the bottom of the nut which surrounds the stud, constitutes the limitation of screwing of the nut on the end threading of said cylindrical part and corresponds to the positioning of the obturation member in its second position;

the safety valve comprises two O-rings which, in the configuration of assembly of the solenoid with the valve body, are interposed, one between said solenoid coil and the valve body, the other between said solenoid coil and the clamping face of the nut.

The principal advantage of the invention naturally resides in the obtaining of a safety valve provided with a voluntary emergency control for opening thereof, whose normal and emergency functioning is more reliable due to a considerable reduction of attacks of the inside control mechanism by corrosion.

BRIEF DESCRIPTION OF THE DRAWINGS

The invention will be more readily understood on reading the following description with reference to the accompanying drawings, in which.

DETAILED DESCRIPTION OF THE DRAWINGS

Figures 1, 2:
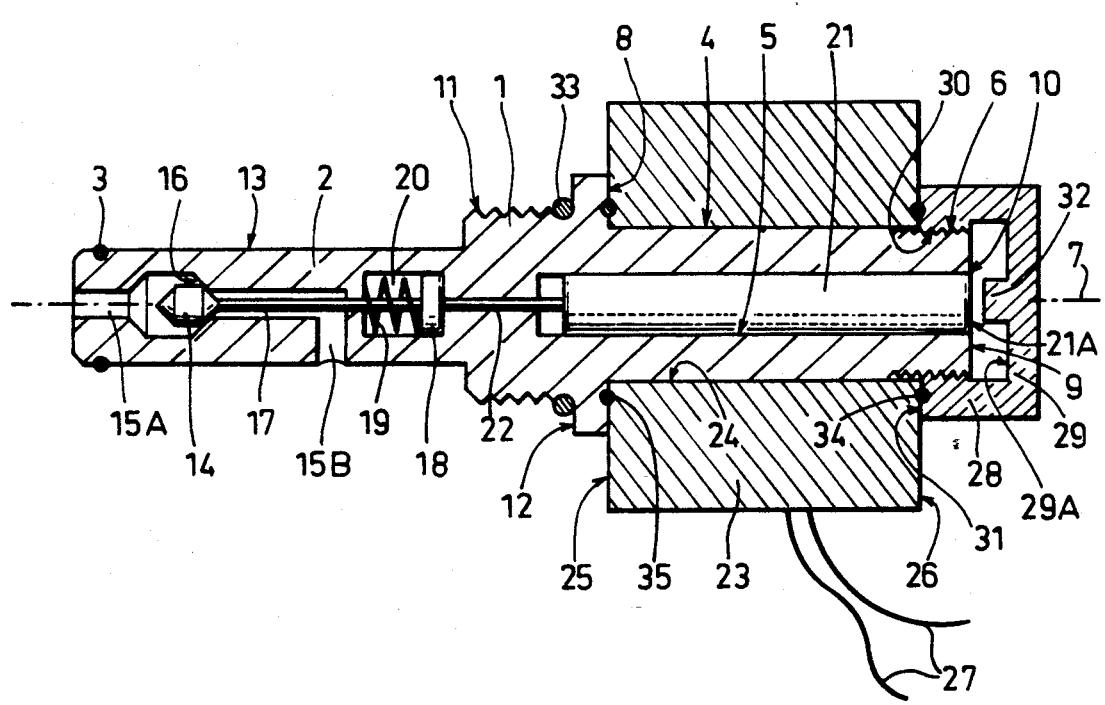
FIG. 1 is an axial section through a safety valve according to the invention in its normal operational configuration.
FIG. 2 is an axial section through the safety valve of FIG. 1, similar to that of FIG. 1. but in the configuration of opening of said valve by voluntary control.

Referring now to the drawings, the safety valve of FIGS. 1 and 2 comprises:

a valve body 1 provided: with an obturation head 2 whose outer face 13 is cylindrical and comprises a groove for receiving an O-ring 3; disposed in line with the obturation head 2, with a cylindrical part 4 which comprises a coaxial bore 5 and an end threading 6, and which is longitudinally defined, parallel to axis 7 of the bore 5, in the vicinity of the obturation head 2 by a shoulder 8 and, at its opposite end, by a transverse edge 9 into which opens out said bore 5 via an orifice 10; and with a threading 11 disposed between the obturation head 2 and a second shoulder 12, parallel to the shoulder 8 and oriented in the opposite direction;

an obturation member 14, disposed on an inner conduit in two parts 15A, 15B formed inside the obturation head 2, and capable of being placed in a first position (FIG. 1), in which, being in abutment on a valve seat 16 formed in the obturation head 2, it insulates from each other the two parts 15A, 15B of the inner conduit, therefore obturates the latter, the safety valve then being in a so-called configuration of obturation, or, in a second position (FIG. 2), in which, being out of abutment on the valve seat 16, the two parts 15A, 15B of the inner conduit are in mutual communication;

a connecting rod 17, fast with the obturation member 14, provided with a flange 18;

an elastic return member 19, here a spring, contained in a housing 20 made in the valve body 1, and interposed between said valve body 1 and the flange 18, its effect tending to return the obturation member 14 towards its first position, of FIG. 1, or to maintain it therein;

an electromagnet comprising a core 21, contained inside bore 5 and being mounted to slide therein parallel to axis 7, being connected to flange 18 by a rod 22; a solenoid coil 23 presenting an axial cavity 24 allowing passage of the cylindrical part 4 of the valve body and defined by two transverse end faces 25, 26; wires 27 connecting the solenoid coil to a source of electrical energy;

a nut 28 which comprises: a bottom 29 rendering it blind; a tapping 30 capable of cooperating with the end threading 6 of the cylindrical part 4 of the valve body; an outer transverse face 31 for clamping, opposite bottom 29; and a stud 32, disposed coaxially to axis 7, opposite bore 5 inside which it is capable of penetrating so as to abut on the end 21A of the core 21, and projecting with respect to the adjacent inner face 29A of the bottom 29;

an O-ring 33 received in a groove in the valve body 1, adjacent shoulder 12.

In the configuration of FIG. 1, the solenoid coil 23 is traversed by the cylindrical part 4 of the valve body and is fixed on said valve body by abutment of the clamping face 31 of nut 28 on one (26) of its transverse faces with the interposition of an O-ring 34, and by abutment of its other transverse face 25 on the shoulder 8 with the interposition of an O-ring 35. The length of the solenoid coil 23 (distance between faces 25 and 26), is such that after clamping of the nut 28, the stud 32 remains out of abutment on the end 21A of the core 21, the elastic return member 19 being the only one to act on the obturation member 14 and maintaining it in its first position of obturation of conduit 15A–15B.

In the configuration of FIG. 2, it has been assumed that a breakdown had been observed in the functioning of the control of the safety valve via the electro-magnet. After the nut 28 is unscrewed, the solenoid coil 23 has been removed, then nut 23 rescrewed until the stud 32 abuts on the end 21A of the core 21 and repels the latter so as to place the obturation member 14 in its second position for communication of the two parts 15A, 15B of the inner conduit. The following points should be noted in this configuration:

the protuberance of the stud 32 has been provided so that the positioning of the obturation member 14 in its second position is effected when the inner face 29A of the bottom 29 of the nut is in abutment on the transverse end edge 9 of the cylindrical part 4 of the valve body, which constitutes a convenient arrangement allowing the user to know from which moment the obturation member is effectively placed in its second position;

no O-ring has been provided between the nut 28 and the valve body, which, a priori, renders possible the introduction of humidity inside the mechanism, particularly inside bore 5;

it will be subsequently seen that this drawback is only apparent; in any case, it would also be in accordance with the invention to dispose an O-ring between the nut 28 and the valve body.

Figure 3:
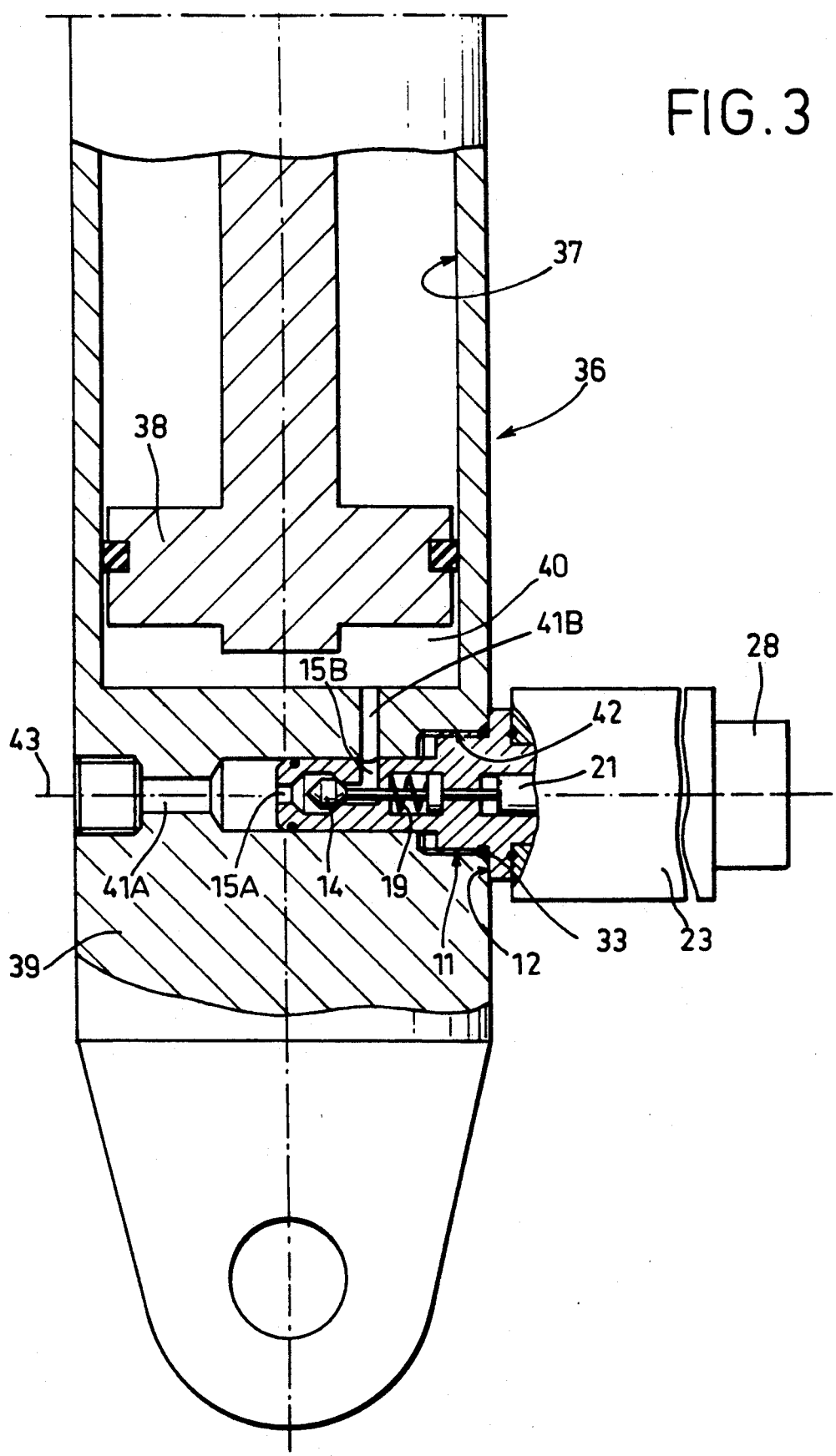
FIG. 3 is a section through one end of a hydraulic jack provided with the safety valve of FIGS. 1 and 2.

FIG. 3 shows the assembly of a safety valve on a jack 36 constituted by:

a cylinder 37;

a piston 38, mounted to slide inside the cylinder 37 and defining with the bottom 39 of said cylinder a working chamber 40;

a conduit inside said bottom 39 comprising two parts 41A, 41B which, the safety valve being placed in position on the bottom 39 by screwing the threading 11 in a tapping 42 made in the bottom 39, communicates part 41A with part 15A of the safety valve and with an outer conduit 43 and, part 41B with part 15B of the safety valve and with the working chamber 40.

The O-ring 33 is interposed between the bottom 39 of the cylinder and the shoulder 12 of the valve body.

In the configuration of FIG. 3, the safety valve is provided with its electromagnet, including the solenoid coil 23, capable of controlling opening thereof, and therefore the communication of parts 15A, 15B of its inner conduit, by the solenoid coil 23 being supplied with electrical energy. In this way, the working chamber 40 may be placed in communication with conduit 43 and be either supplied with fluid under pressure or be placed in communication with a fluid discharge reservoir. When the working chamber 40 must be insulated from the outer conduit 43, the fact of stopping supply of electrical energy to solenoid coil 23 eliminates the force that it developed and which was antagonistic and preponderant with respect to the return force of the elastic member 19: the elastic member 19 acts alone and places the obturation member 14 in its first position of tight obturation of the inner conduit 15A–15B.

If a failure occurs, for example if the electromagnetic valve-opening control stops functioning, the user has the possibility of modifying the configuration of the safety valve, shown in FIG. 1, to adopt the configuration of FIG. 2. As he so desires, he re-establishes communication between parts 15A and 15B of the inner conduit of the safety valve, which renders possible again the communication of the working chamber 40 of the jack 36 with the outer conduit 43 and effects unblocking of the member controlled by this jack: for example, unblocking of an elevator endboard in position of load-handling, or the like.

In the configuration of FIGS. 1 and 3, the safety valve, on the one hand, is mounted with seal (O-ring 33) on the jack 36, on the other hand, is itself mounted in tight manner (O-rings 34, 35). No humidity can attack the internal mechanism of the safety valve by corrosion, which consequently eliminates any risk of deterioration and permanently reduces the risk of breakdowns, whilst, according to certain prior arrangements, the humidity could permanently penetrate inside the mechanism via the non-hermetic clearance existing between the threading of the screw for unlocking the obturation member and the corresponding tapping of the valve body.

In the configuration of FIG. 2, the risk of introduction of humidity between threading 6 and tapping 30 of nut 28 effectively exists. However, it must not be forgotten that this configuration is exceptional and temporary: it is chosen only when the normal (electromagnetic) safety valve-opening control breaks down, which is, in principle, rare, and which, moreover, is even more rare with the safety valve described. Moreover, this configuration of FIG. 2 is only temporary: the time to replace the electromagnetic control. During these short, exceptional periods, the humidity which possibly penetrates cannot damage the mechanism of the valve, as its corrosive attack is not permanent.

The invention is not limited to the embodiments described, but covers, on the contrary, all the variants that may be made thereto without departing from the scope nor spirit thereof.

What is claimed is:

1. A safety valve for fluid circuit comprising:
    a valve body comprising a cylindrical part which itself comprises an axial bore and an end threading;
    an obturation member, mobile with respect to said valve body, placed on a conduit which it separates into two parts, and capable of selectively occupying a first position, in which it obturates said conduit, and a second position in which the two parts of said conduit are in mutual communication;
    an elastic member for returning the obturation member into its first position;
    an electromagnet for electrically controlling opening of the valve, which comprises a solenoid coil presenting an axial cavity allowing passage of the cylindrical part of the valve body, as well as a core coupled to the obturation member and contained inside said bore;
    a blind nut which comprises a tapping capable of cooperating with said end threading of said cylindrical part of the valve body in order to maintain said solenoid coil in its configuration of assembly with the valve body, and which comprises a face for clamping and a bottom opposite said clamping face;

wherein:
    a) a stud, fast with the nut, projects with respect to the inner face of the bottom of the nut and opposite the bore of said cylindrical part of the valve body;
    b) in the configuration of assembly of the solenoid coil with the valve body (FIG. 1), the clamping face of the nut is in abutment on the solenoid coil, the axial length of said solenoid coil being such that said stud is then out of abutment on the end of the core of electro-magnet, the obturation member being, in addition, disposed in its first position; and,
    c) in a configuration in which the solenoid coil is not disposed around said cylindrical part of the valve body (FIG. 2), the fact of screwing the nut on the end threading of said cylindrical part is capable of placing said nut in a position with respect to the valve body in which the stud is in abutment on the end of the core of the electromagnet and has repelled said core and the obturation member coupled thereto, placing this obturation member in its second position.

2. The safety valve of claim 1, wherein the placing in abutment of the transverse end edge of the cylindrical part of the valve body on that part of the inner face of the bottom of the nut which surrounds the stud, constitutes the limitation of screwing of the nut on the end threading of said cylindrical part and corresponds to the positioning of the obturation member in its second position.

3. The safety valve of claim 1, wherein it comprises two O-rings which, in the configuration of assembly of the solenoid with the valve body (FIG. 1), are interposed, one between said solenoid coil and the valve body, the other between said solenoid coil and the clamping face of the nut.

4. The safety valve of claim 2, wherein it comprises two O-rings which, in the configuration of assembly of the solenoid with the valve body (FIG. 1), are interposed, one between said solenoid coil and the valve body, the other between said solenoid coil and the clamping face of the nut.

* * * * *